(12) United States Patent
Duckett, III (10) Patent No.: US 12,474,208 B2
(45) Date of Patent: Nov. 18, 2025

(54) IMAGING SPECTROMETER AND CAMERA WITH SLIDING LENS GROUP

(71) Applicant: KARL STORZ Imaging, Inc., Goleta, CA (US)

(72) Inventor: George E. Duckett, III, Castaic, CA (US)

(73) Assignee: KARL STORZ Imaging, Inc., Goleta, CA (US)

( * ) Notice: Subject to any disclaimer, the term of this patent is extended or adjusted under 35 U.S.C. 154(b) by 53 days.

(21) Appl. No.: 18/401,342

(22) Filed: Dec. 30, 2023

(65) Prior Publication Data

US 2025/0216258 A1 Jul. 3, 2025

(51) Int. Cl.
*G01J 3/28* (2006.01)
*G01J 3/14* (2006.01)
*G01J 3/18* (2006.01)

(52) U.S. Cl.
CPC .............. *G01J 3/2823* (2013.01); *G01J 3/14* (2013.01); *G01J 3/18* (2013.01); *G01J 2003/2826* (2013.01)

(58) Field of Classification Search
CPC .... G01J 3/28; G01J 3/2823; G01J 3/14; G01J 3/18; G01J 2003/2826
See application file for complete search history.

(56) References Cited

U.S. PATENT DOCUMENTS

| | | | |
|---|---|---|---|
| 5,760,899 A * | 6/1998 | Eismann | G01J 3/14 250/226 |
| 5,926,283 A | 7/1999 | Hopkins | |
| 6,495,818 B1 | 12/2002 | Mao | |
| 7,636,158 B1 * | 12/2009 | Pawluczyk | G01J 3/0208 356/326 |
| 2005/0243312 A1 * | 11/2005 | Geshwind | G01J 3/2846 356/330 |
| 2008/0088840 A1 | 4/2008 | Bodkin et al. | |
| 2011/0222061 A1 | 9/2011 | Desserouer | |
| 2011/0285995 A1 * | 11/2011 | Tkaczyk | G01J 3/02 356/326 |
| 2012/0062889 A1 | 3/2012 | Chrisp et al. | |
| 2012/0250016 A1 | 10/2012 | Comstock et al. | |
| 2014/0293062 A1 * | 10/2014 | Hoye | G01J 3/2803 348/162 |

OTHER PUBLICATIONS

Matos, Taina, International Search Report and Written Opinion, Jan. 21, 2025, pp. 1-11, International Search Authority, USA.

* cited by examiner

*Primary Examiner* — Abdullahi Nur
(74) *Attorney, Agent, or Firm* — David N. Villalpando; Jacqueline Cohen (57) ABSTRACT

A hyperspectral imaging device includes an optical channel arranged to focus light at a first image plane. A spectrometer includes a slit formed at the first image plane to allow a slit-shaped portion of the light pass through. A dispersive element receives light from the slit and spectrally disperses it along a direction perpendicular to a width of the slit. A focusing lens focuses the spectrally dispersed light at a second image plane such that the spectral dispersion is imaged along a first axis thereof, and a spatial image of the slit width is imaged along a second axis for detection by a sensor. A sliding lens group between the optical channel and the first image plane moves to direct the incident light, scanning the entire image over the slit such that multiple frames acquired by the sensor each correspond to a horizontal line of the image.

19 Claims, 8 Drawing Sheets

IMAGING SPECTROMETER AND CAMERA WITH SLIDING LENS GROUP

TECHNICAL FIELD

This disclosure relates to multispectral imaging (MSI) or hyperspectral imaging (HSI) systems, and more particularly to an imaging systems and devices including imaging spectrometers.

BACKGROUND

Classical video endoscopes are used for color video imaging of an examination area inside the body. Multispectral or hyperspectral imaging can provide users of endoscopes with additional information that can be used during operations or diagnostics. For example, in medical technology, physiological imaging with multispectral or hyperspectral methods may be used to analyze physiological parameters such as hemoglobin content and the oxygenation of hemoglobin in the examination area, which are displayed spatially resolved by false colors. Multispectral and hyperspectral imaging also have a variety of further applications both in and outside the medical field.

To integrate multispectral or hyperspectral imaging capability with a medical scope typically requires an imaging spectrometer construction that is small in size and, depending on the application, inexpensive as compared to typical imaging spectrometers for other applications. However, existing spectrograph designs for endoscopic use often include relatively large mechanical assembly which moves the spectrograph entrance slit with respect to the incoming light by moving the entire spectrographic optical assembly including the slit, optics, and sensor. Such designs require a relatively large and powerful motor or movement actuator, along with a relatively large mechanical assembly for moving and stabilizing the spectrograph. Such designs are also subject to increased problems such as calibration issues or mechanical failures due to the size of the optical assembly that is moved.

BRIEF DESCRIPTION OF THE INVENTION

It is an object of the invention to provide hyperspectral imaging devices and cameras with improved spectrometer mechanical stability. It is a further object of the invention to provide such devices with a scanning arrangement that is mechanically simple and easy to manufacture. It is a further object of the invention to provide such devices that can operate across a desired range while being sized to fit in the form factor for a medical scope camera.

According to a first aspect of the invention, a hyperspectral imaging device includes an optical channel arranged to focus incident light at a first image plane to form an image at a first image plane. A spectrometer includes a slit formed in an optical stop at the first image plane to allow a slit-shaped portion of the incident light pass through. A dispersive element is constructed and arranged to receive incident light from the slit and spectrally disperse it along a direction perpendicular to a width of the slit. A focusing lens is arranged to focus the spectrally dispersed light at a second image plane such that the spectral dispersion is imaged along a first axis of the second image plane, and a spatial image of the slit width is imaged along a second axis of the image plane. A focal plane array sensor at the second image plane is operable to detect the spectrally dispersed light. A sliding lens group is arranged between the optical channel and the first image plane and adapted to move linearly in a direction perpendicular to an optical axis of the imaging channel and perpendicular to a length of the slit, to direct the incident light in a varying offset position thereby scanning the entire image over the slit such that multiple frames acquired time sequentially by the focal plane array sensor each correspond to a horizontal line of the image.

According to some implementations of the first aspect, the hyperspectral imaging device also includes an image processor communicatively connected to the focal plane array sensor and operable to process the multiple frames into a hyperspectral or multispectral data cube including data sufficient for a 2D image of the scene at a multiplicity of spectral bands. The image processor may also be operable to create an image based on the hyperspectral or multispectral data cube for display to the user which conveys information not easily discernible by white light imaging.

According to some implementations of the first aspect, the imaging objective is telecentric.

According to some implementations of the first aspect, the sliding lens group is afocal.

According to some implementations of the first aspect, a distal lens surface of the sliding lens group is convex and a proximal lens surface is concave. The sliding lens group may also include a cemented doublet with an overall meniscus shape.

According to some implementations of the first aspect, the hyperspectral imaging device further includes a collimating lens group optically arranged between the slit and the dispersive element.

According to some implementations of the first aspect, the dispersive element includes a diffraction grating. The diffraction grating may be a blazed diffraction grating.

According to some implementations of the first aspect, the dispersive element includes a prism.

According to some implementations of the first aspect, the hyperspectral imaging device further includes a beamsplitter upstream from the slit adapted to redirect a portion of incident light from the scene such that it is imaged onto a third image plane without passing through the slit. A sensor may be placed in the third image plane which collects the redirected portion of light and creates a white light image at a frame rate suitable for live video. The sliding lens group may be positioned between the beamsplitter and the slit.

According to a second aspect of the invention, an imaging spectrometer camera is adapted to receive incident light from a medical scope. An optical channel receives and focuses the incident light at a first image plane to form an image at the first image plane. An imaging spectrometer is positioned downstream from the optical channel and includes a slit formed in an optical stop at the first image plane to allow a slit-shaped portion of the incident light pass through. A dispersive element is constructed and arranged to receive incident light from the slit and spectrally disperse it along a direction perpendicular to a width of the slit. A focusing lens is arranged to focus the spectrally dispersed light at a second image plane such that the spectral dispersion is imaged along a first axis of the second image plane, and a spatial image of the slit width is imaged along a second axis of the image plane. A focal plane array sensor at the second image plane is operable to detect the spectrally dispersed light. A scanning system includes a sliding lens group arranged in the optical channel upstream of the first image plane and adapted to move linearly in a direction perpendicular to an optical axis of the imaging channel and perpendicularly to length of the slit, to direct the incident light in a varying offset position thereby scanning the entire image over the slit such that multiple frames acquired time sequentially by the focal plane array sensor each correspond to a horizontal line of the image.

According to some implementations of the second aspect, the imaging spectrometer camera also includes an image processor communicatively connected to the focal plane array sensor and operable to process the multiple frames into a hyperspectral or multispectral data cube including data sufficient for a 2D image of the scene at a multiplicity of spectral bands. The image processor may also be operable to create an image based on the hyperspectral or multispectral data cube for display to the user which conveys information not easily discernible by white light imaging.

According to some implementations of the second aspect, the imaging objective is telecentric.

According to some implementations of the second aspect, the sliding lens group is afocal.

According to some implementations of the second aspect, a distal lens surface of the sliding lens group is convex and a proximal lens surface is concave. The sliding lens group may also include a cemented doublet with an overall meniscus shape.

According to some implementations of the second aspect, the hyperspectral imaging device further includes a collimating lens group optically arranged between the slit and the dispersive element.

According to some implementations of the second aspect, the dispersive element includes a diffraction grating. The diffraction grating may be a blazed diffraction grating.

According to some implementations of the second aspect, the dispersive element includes a prism.

According to some implementations of the second aspect, the hyperspectral imaging device further includes a beamsplitter upstream from the slit adapted to redirect a portion of incident light from the scene such that it is imaged onto a third image plane without passing through the slit. A sensor may be placed in the third image plane which collects the redirected portion of light and creates a white light image at a frame rate suitable for live video. The sliding lens group may be positioned between the beamsplitter and the slit.

These and other features of the invention will be apparent from the following description of the preferred embodiments, considered along with the accompanying drawings.

BRIEF DESCRIPTION OF THE DRAWINGS

The invention is further explained by the following exemplary descriptions of particular embodiments.

DETAILED DESCRIPTION OF THE VARIOUS EMBODIMENTS

Figure 1:
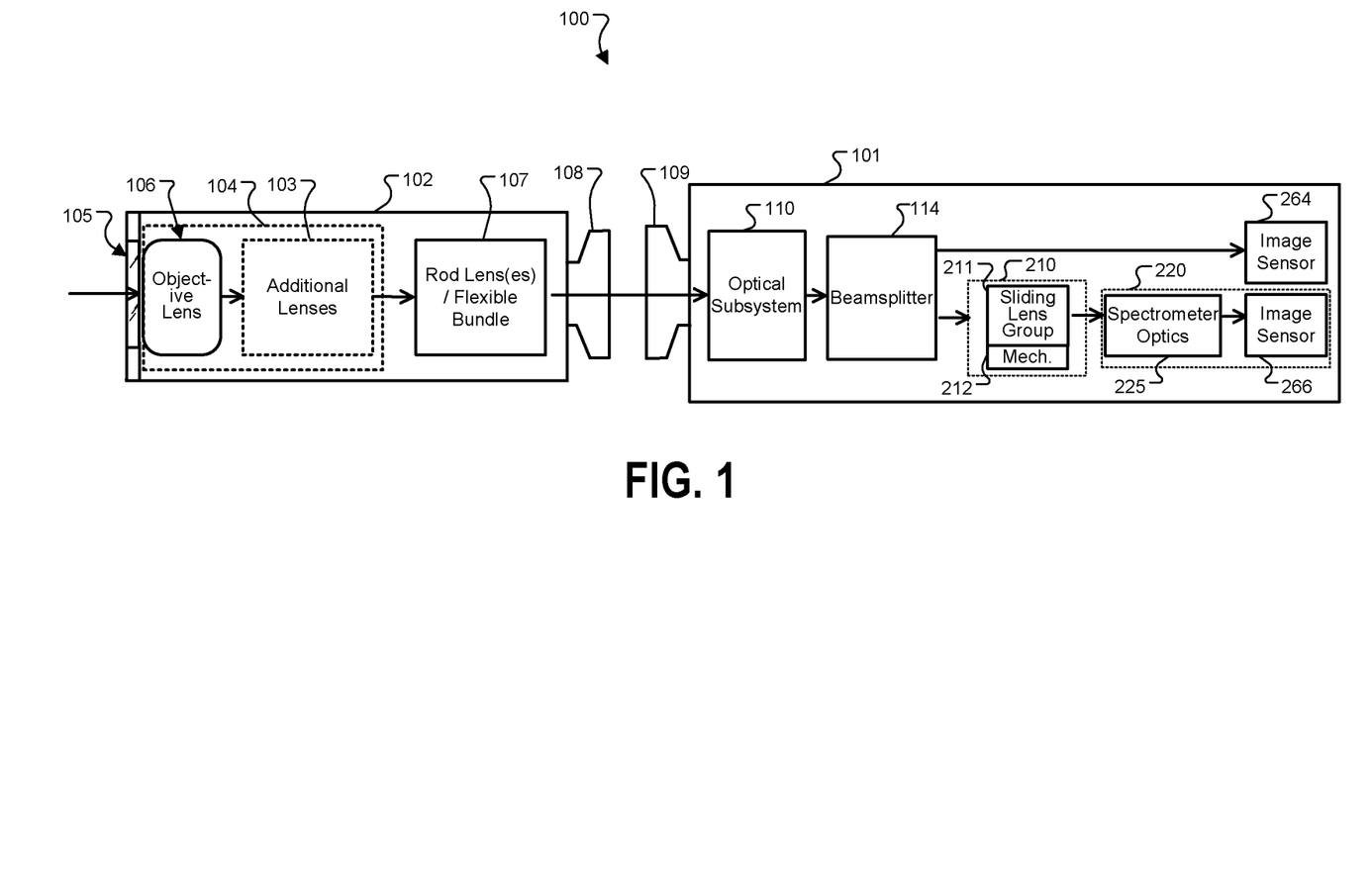
FIG. 1 is a block diagram of an imaging spectroscopy device according to an example embodiment of the invention.

FIG. 1 is a block diagram of an imaging spectroscopy device 100 according to an example embodiment of the invention. Imaging spectroscopy device 100 ("device 100") includes a camera head 101 which may have an endoscope 102 attached via connectors 108 and 109. In some embodiments, an endoscope 102 and camera head 101 may be integrated into a single housing with no connectors needed. In some embodiments, device 100 is provided as only the camera head 101 adapted to be connected to a suitable endoscope or other medical scope. In other embodiments, an imaging spectrometer as described herein may be employed with other imaging arrangements that do not use a scope. Connectors 108 and 109 in this embodiment constitute what is generally called a "claw coupling" or dock-clutch coupling, comprising a clutch that couples two components, whereby at least one or both components are rotatable. Preferably, the claw (109) of the claw coupling is designed such that the eyepiece cup (108) is pushed towards the interface portion to engage the connection. Connectors 108 and 109 may be any suitable connector allowing light to pass from endoscope 102 to camera head 101. An objective lens (OL) adapter may also be included in one of connectors 108 or 109 for adjusting the focus of incident light from endoscope 102. Various structural components supporting the depicted elements are omitted in the diagrams herein, as well as other components such as illumination lights sources and controls, which are known in the art and are not shown in order to avoid obscuring the relevant details of the example embodiments of the invention.

Camera head 101 includes an optical subsystem 110 that transmits light used for hyperspectral or multispectral imaging in a desired spectrum, which may include non-visible light wavelengths. Optical subsystem 110 positioned at or behind a central window of connector 109 to receive and condition image light from the endoscope 102 or other objective optics. Optical subsystem 110 typically includes a number of lenses for focusing and conditioning the image light and forms an imaging channel with endoscope 102 or other objective optics for focusing the image light at a first image plane of scanning system 210. Many suitable lenses and combinations of lenses may be used for optical subsystem 110.

An optional beamsplitter 114 is positioned downstream from the first optical subsystem and separates light into two beams, one directed toward a first image sensor 264 which produces visible light images to accompany the images produced by the other beam using the spectrometer.

An imaging spectrometer 220 receives the imaging light from beamsplitter 114. Imaging spectrometer 220 includes a scanning system 210, a spectrometer optical assembly 225, and an image sensor 266. In some embodiments, more than one image sensor 266 may be used, however a single image sensor is preferred. Scanning system 210 includes a sliding lens group 211 arranged in the optical channel upstream of spectrometer optical assembly 225. Scanning system 210 includes a scanning mechanism 212 adapted to move sliding lens group 211 linearly in a direction perpendicular to an optical axis of the imaging channel. As further described below, this movement scans the image light over a slit in spectrometer optical assembly 225 such that multiple frames, acquired time sequentially by the focal plane array sensor 266, each correspond to a horizontal line of the image. Scanning mechanism 212 includes a motor or mechanical actuator with a mechanism such as a screw and one or more rods to gears mechanically coupling it to sliding lens group 211 to achieve the movement. Guide rails or another guiding structure hold sliding lens group 211 and limit its movement to the desired range and direction.

Spectrometer optical assembly 225 is optically positioned downstream from scanning system 210 and includes various elements for collimating, refracting, and diffracting the image light in a spectrally dispersed form onto image sensor 266, as further described below. For embodiments without a beamsplitter, scanning system 210 is directly downstream from optical subsystem 110. Image sensor 266 is preferably a focal plane array sensor and may be a color sensor or a grayscale sensor, which in certain embodiments throughout this disclosure may be preferred for the HSI/MSI sensor 266, as, as will be discussed below, spectral data is encoded spatially along the vertical axis of the sensor and can thus be known by its position on the sensor. By contrast, using a color sensor 266, some light intensity will be lost by the sensor's color filter array. Further, if data binning is desired, it may be more easily performed if the data is encoded by a monochromatic sensor. This, however, is not limiting, as the use of a color sensor (including the practical concern of color sensors being generally more widely available) may offer other advantages.

In some embodiments, device 100 includes an endoscope 102 as depicted at the left of the block diagram. The depicted endoscope is an example only, and many endoscope designs are suitable, including rigid and flexible endoscopes. Endoscope 102 includes a cover glass 105 at its distal tip, which in this version faces directly along the longitudinal axis of the endoscope 102, but may also be positioned at an angle relative to the longitudinal axis as is known in the art. Behind, or on the proximal side of, cover glass 105 is shown a preferred position for the objective lens 106, set against or very near cover glass 105 and preferably assembled together with the cover glass in construction. Objective lens 106 may be part of an objective lens group 104 which may include one or more additional lenses 103. The particular number and arrangement of lenses in the endoscope 102 will vary widely depending on the application. Optically arranged or attached at the proximal side of objective lens 106 or objective lens group 104 is flexible fiber bundle or a series of one or more rod lenses 107, which serve to pass the light down endoscope 102 in the proximal direction. For embodiments with a flexible shaft, the flexible fiber bundle is used. For rigid or semi-rigid shafts, one or several rod lenses 107 are employed, which may be separated by spacers or other lenses in any suitable manner known in the art.

Figure 2:
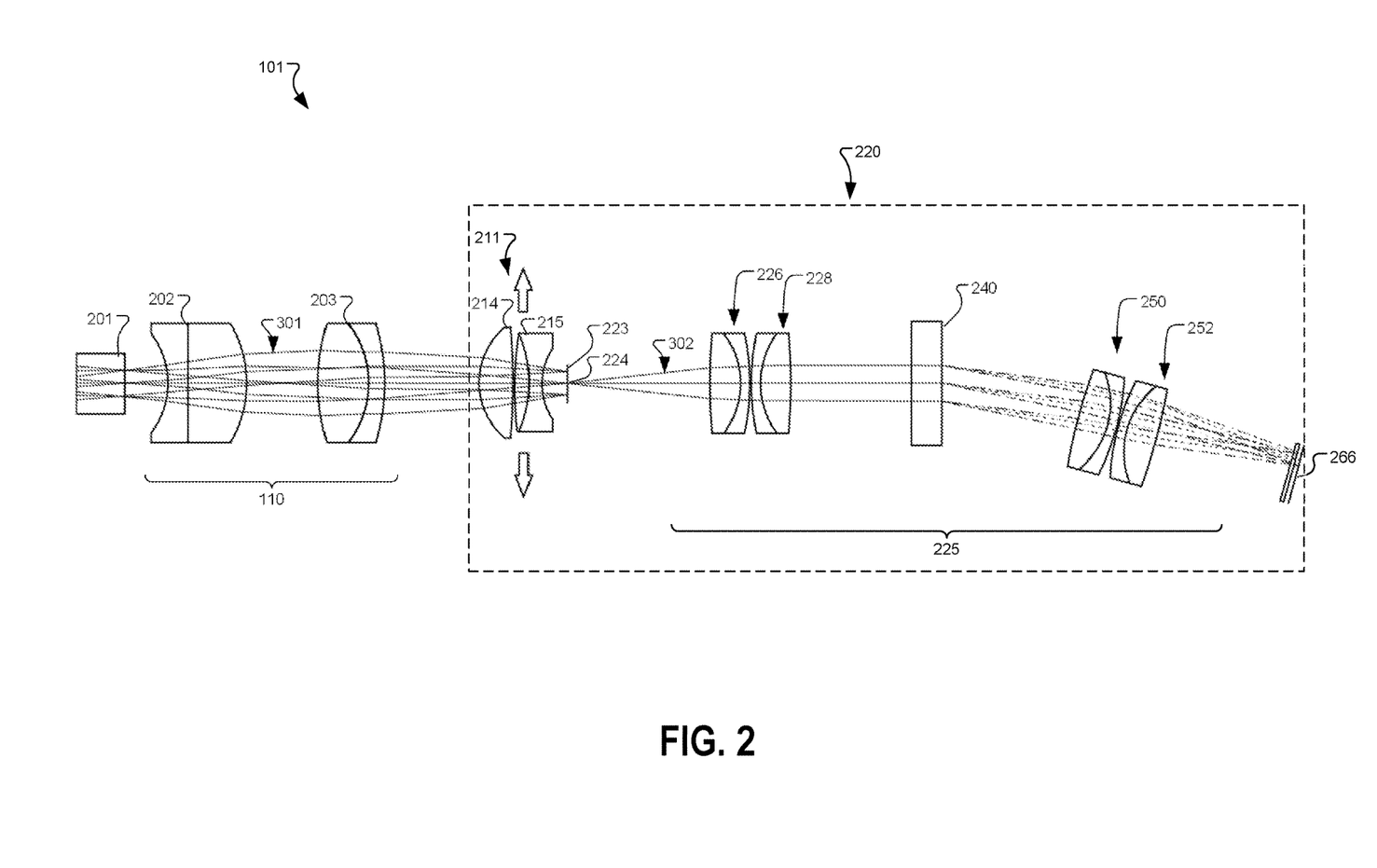
FIG. 2 is a partial cross section diagram of a camera head showing the optical assembly construction according to an example embodiment.

FIG. 2 is a partial cross section diagram of a camera head 101 showing construction of an optical assembly for a spectrometer according to an example embodiment. In this embodiment, no beamsplitter is used. The cross section diagram includes a light ray diagram showing image light 301 passing through an optical channel including an optical subsystem 110 and focused toward a first imaging plane at slit 224. A light ray diagram shows a portion of image light 301, labeled 302, which is passed through slit 224 and spectrometer optical assembly 220 for image spectroscopy. The depicted optical elements are in diagram form only and are not drawn to scale. The depicted optical assembly may be employed with devices and systems having an integrated camera or an external detachable camera head.

As shown, image light 301 enters the optical assembly at a cover glass block 201 in this embodiment. Image light 301 then passes downstream to optical subsystem 110, which in this embodiment is an imaging objective including a doublet lens 202 and a doublet lens 203. Optical subsystem 110 may form a complete imaging objective in some embodiments or may be paired with an objective lens and other optics, such as those of an endoscope, to form an imaging objective. Doublet lens 202 includes a concave-plano lens followed by a plano-convex lens, which together have a slightly positive power. Doublet lens 203 includes a bi-convex lens followed by a concave-convex lens, which together have a positive power and serve to focus image light 301. These two doublets are designed to focus and align image light 301 along the central optical axis toward a sliding lens group 211 while mitigating optionally chromatic aberrations. Various other lens combinations may be used to achieve the same result in various embodiments.

Sliding lens group 211 of scanning system 210 is positioned downstream of optical subsystem 110 to receive the image light and direct it in a varying offset position toward a first image plane at the position of optical stop 223. A slit 224 is formed in optical stop 223 at the first image plane to allow a slit-shaped portion of the incident light pass through and be directed to spectrometer optical assembly 225. Slit 224 is oriented horizontally at the image plane, such that it extends in the direction into the drawing. Sliding lens group 211 is arranged in the optical channel upstream of the first image plane and adapted to be moved by scanning mechanism 212 (see FIG. 1) linearly in a direction perpendicular to an optical axis of the imaging channel as indicated by the up and down arrows in the drawing. This movement scans the entire image over slit 224 such that multiple frames acquired time sequentially by the focal plane array sensor 226 each correspond to a horizontal line of the image. In some embodiments, an incremental movement of sliding lens group 211 is made and then movement stopped, then frame is acquired, then the next incremental movement is made. In some embodiments, a continuous movement and multiple frames are acquired sequentially during the continuous movement. Sliding lens group 211 is afocal and includes a biconvex lens 214 and a lens pair 215 positioned downstream of biconvex lens 214. Lens pair 215 includes a biconvex lens and a biconcave lens, cemented together as a doublet with an overall meniscus shape. As further described with respect to FIG. 3, sliding lens group 211 is designed such that when it is shifted across the first image plane at slit 224, it moves the image produced at the image plane in the direction of movement, while minimizing aberrations. Sliding lens group 211 is depicted in FIG. 2 in a central position as indicated by the light ray diagram showing a central line of rays at the image plane passing through slit 224.

Optically positioned downstream of slit 224 is spectrometer optical assembly 225, which spectrally disperses the light passed through slit 224 and focuses it onto sensor 226. Spectrometer optical assembly 225 includes a collimating lens group with a doublet lens 226 and a doublet lens 228, which each include a convex-concave lens and a bi-convex lens selected to collimate the diverging incident light while optionally minimizing chromatic aberrations across the spectral range of interest. Various other collimating lens arrangements may be used to achieve the same function in various embodiments. Spectrometer optical assembly 225 may also include an optional filter used to filter incident light to remove wavelengths outside of a desired spectral range for spectrographic analysis. Such a filter may be positioned upstream of slit 224, or upstream of the collimating lens group, or at another point within the spectrometer optical assembly 225. Doublet lens 226 may also have its distal surface coated with filtering material to implement such a filter.

A diffraction grating (in some embodiments a blazed diffraction grating) 240 is positioned in alignment with the collimating lens group to receive the collimated incident light and spectrally disperse it along a direction perpendicular to a width of the slit. The light spectrum of interest is dispersed or fanned out by the diffraction along the downward axis as depicted. While a diffraction grating is used in this embodiment, another type of dispersive element or combination of elements may be used in the same location in other embodiments. For example, a prism or a combination of a prism and a diffraction grating may be used to spectrally disperse the light in the desired direction for sensing.

The diffracted incident light from diffraction grating 240 is focused toward image sensor 266 by a pair of doublet lenses 250 and 252. Various lenses and lens combinations may be employed in different embodiments to perform the focusing functions. In this embodiment, lens doublet 250 includes a bi-convex lens and a concave-plano lens. Lens doublet 252 also includes a biconvex lens and a concave-plano lens.

Image sensor 266 is positioned downstream from doublet lenses 250 and 252 to detect incident light that has been dispersed by diffraction grating 240. Because of the diffraction, various spectral portions of the incident light are distributed along one axis of image sensor 266, which is positioned to detect these portions. The movement of sliding lens group 211 is in the up-down direction with respect to the drawing to sequentially select slit shaped portions of image light 301 in a push-broom fashion, such that the incident light passed through slit 224 is from a different location within incident light 301, to acquire a new line of imaging spectrometer data. Multiple lines are acquired in this fashion to produce an imaging spectrometer image, or a spectral data set such as a hyperspectral data cube.

Figure 3:
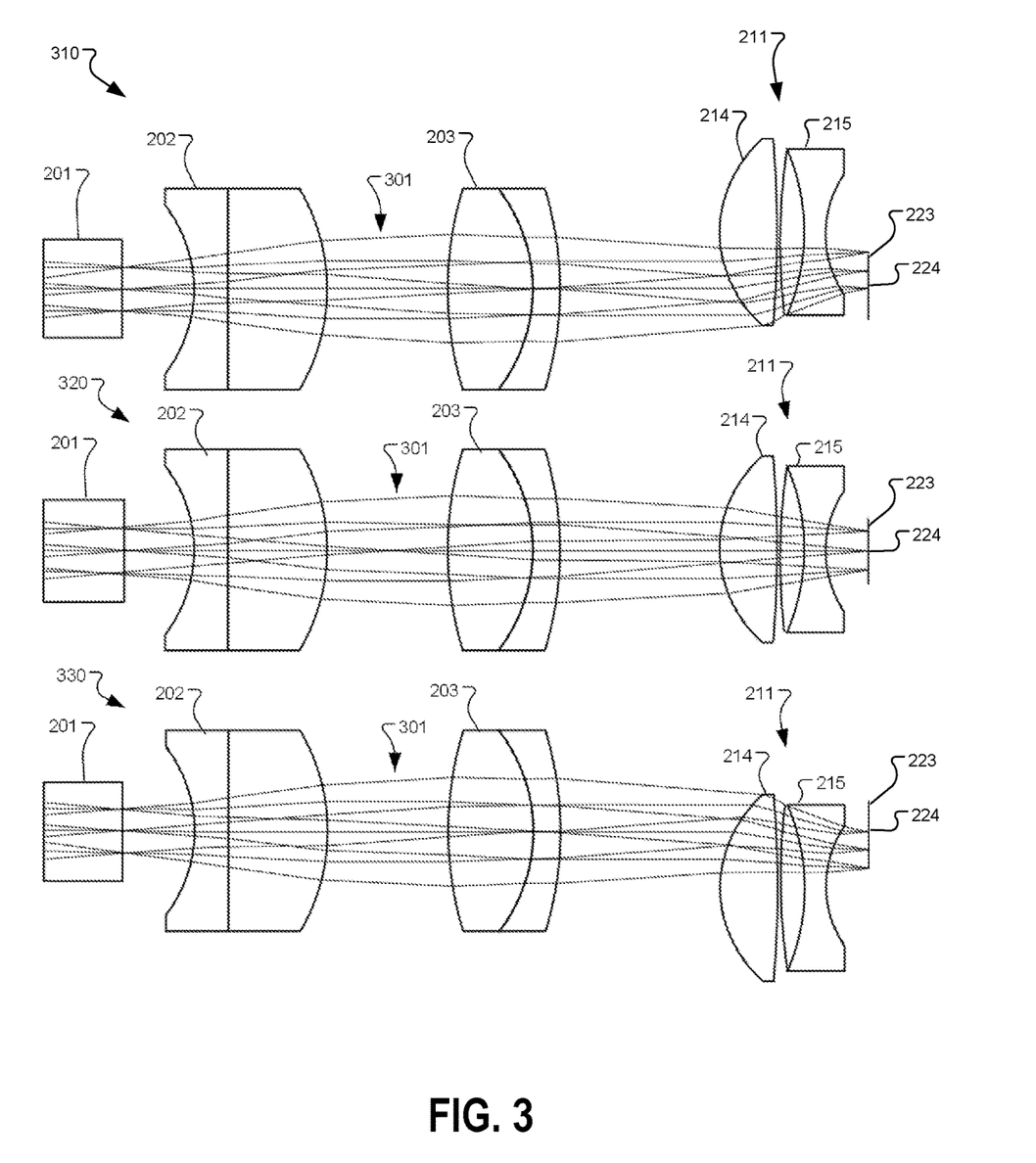
FIG. 3 shows a series of cross section diagrams illustrating the operation of the sliding lens group.
Figure 4:
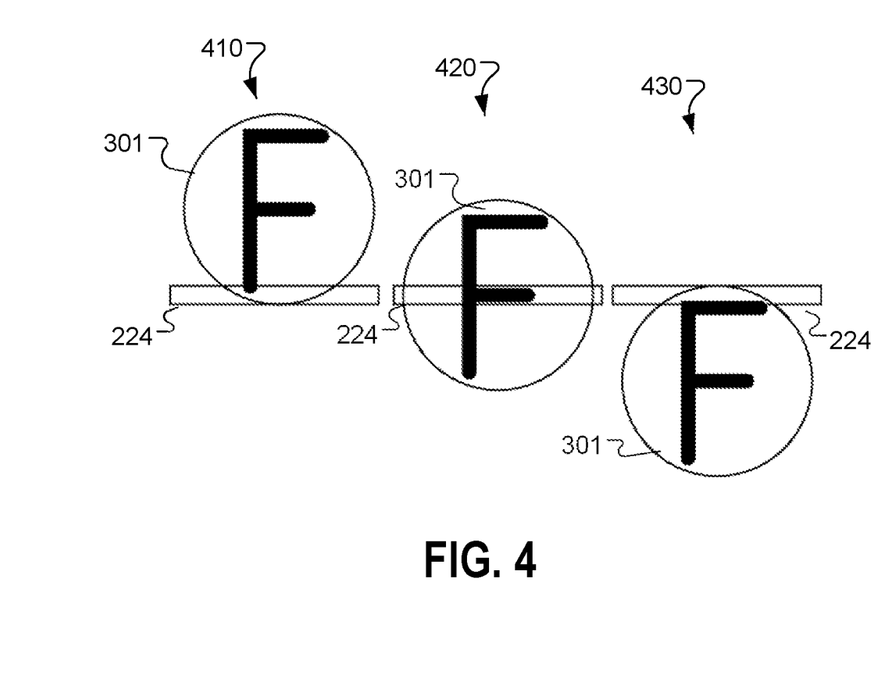
FIG. 4 shows a series of three diagrams illustrating the position of the image formed by the incident light at the first image plane for the three positions shown in FIG. 3.

FIG. 3 shows a series of cross section diagrams illustrating the operation of sliding lens group 211. FIG. 4 shows a series of three diagrams illustrating the position of the image formed by the incident light at the first image plane for the three positions shown in FIG. 3. Referring to FIGS. 3 and 4, three diagrams 310, 320, and 330 show sliding lens group 211 in three positions relative to the optical channel and slit 224. In the central diagram 320, sliding lens group 211 is positioned as depicted in FIG. 2, in a central position in which a center line of the incident light is passed through slit 224. In diagram 420, an image light 301 is shown forming an image of a circled capital letter "F" as it is incident on the image plane and slit 224 with sliding lens group 211 in the central position of diagram 320. As can be seen in diagram 420, slit 224 passes only a central line of light across the image plane.

Diagram 410 shows the resulting image at the first image plane for the position of sliding lens group 211 in diagram 310. As can be seen, the image is shifted at the image plane such that only a lower horizontal slit-shaped portion of the image light is passed by slit 224. Similarly, diagram 430 shows the resulting image at the first image plane for the position of sliding lens group 211 in diagram 330. Here, only an upper horizontal slit-shaped portion of the image light is passed by slit 224.

In operation, sliding lens group 211 is incrementally moved from one of its extreme positions, shown in diagrams 310 and 330, to the other. At each increment, sensor 266 acquires an image or frame of the spectral dispersion of the image light passing through slit 224. Preferably a large number of movement increments are used, resulting in a large number of frames each showing spectral content of a horizontal line from incident light 301. An image processor (FIG. 8) is used process the multiple frames into a hyperspectral or multispectral data cube comprising data sufficient for a 2D image of the scene at a multiplicity of spectral bands.

Figure 5:
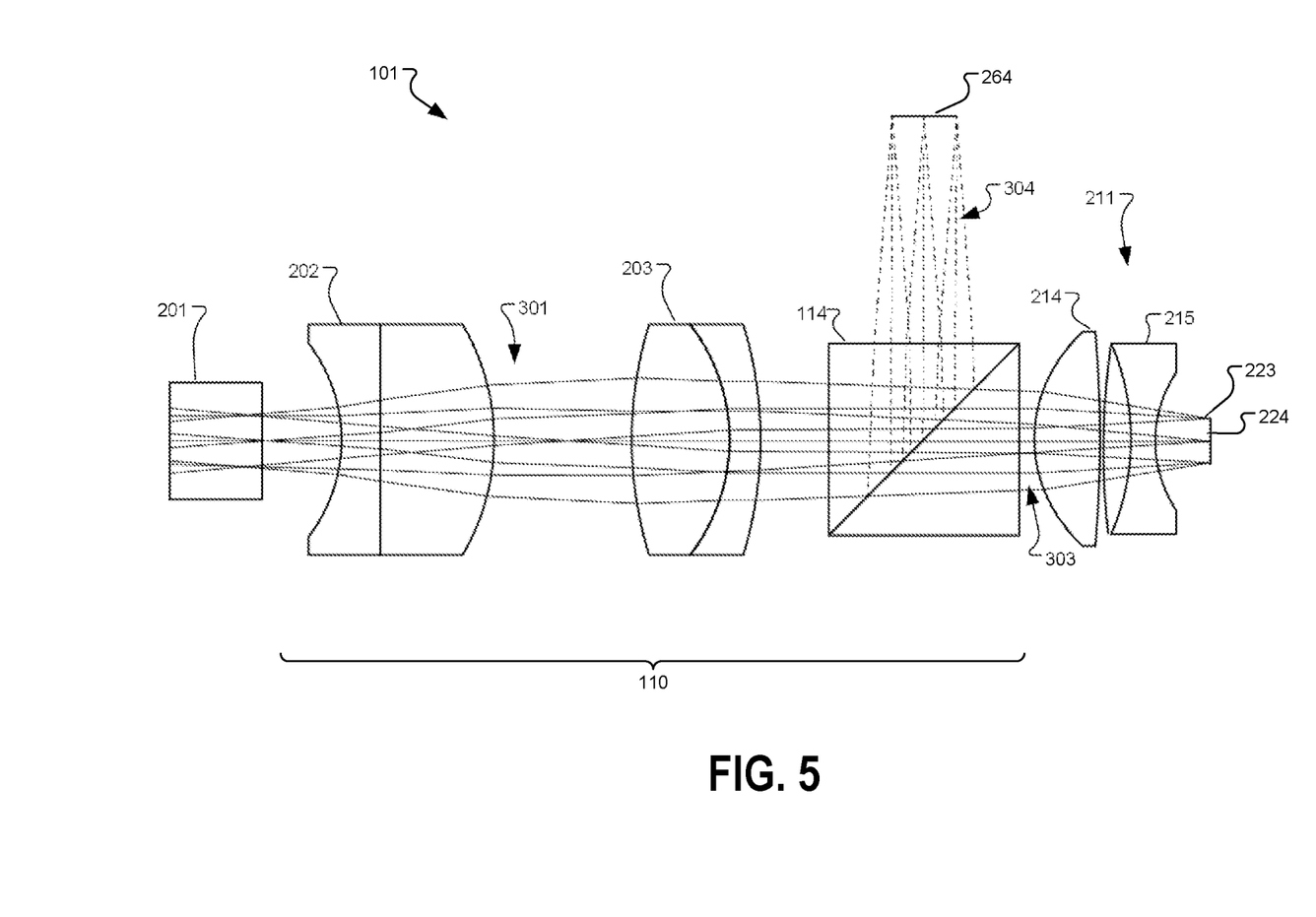
FIG. 5 is a partial cross section diagram of a camera head showing an optical assembly construction including a beamsplitter according to another example embodiment.

FIG. 5 is a partial cross section diagram of a camera head showing the construction of an optical assembly according to an example embodiment including a beamsplitter. The depicted partial optical assembly of camera head 101 is constructed similarly to that of FIG. 2, with beamsplitter 114 added upstream of sliding lens group 211, reflecting a portion of incident light 301 to form an image at image sensor 264. The cross section diagram includes a light ray diagram showing image light 301 passing through an optical channel including an optical subsystem 110. The depicted optical elements are in diagram form only and are not drawn to scale.

As shown, image light 301 enters the optical assembly at a cover glass block 201 in this embodiment. Image light 301 then passes downstream to optical subsystem 110, which is an imaging objective including a doublet lens 202 and a doublet lens 203. Optical subsystem 110 may form a complete imaging objective in some embodiments, or may be paired with an objective lens and other optics, such as those of an endoscope, to form an imaging objective. Doublet lens 202 includes a concave-plano lens followed by a plano-convex lens, which together have a slightly positive power. Doublet lens 203 includes a bi-convex lens followed by a concave-convex lens, which together have a positive power and serve to focus image light 301. These two lens pairs are designed to focus and align image light 301 along the central optical axis toward beamsplitter 114 and sliding lens group 211 while optionally mitigating chromatic aberrations.

Beamsplitter 114, in this embodiment, is constructed with two right angle prisms with a suitable partially reflective coating along their adjacent surface, by which the image light is split with a first portion passing straight through along first optical path 303 and a second portion reflected upward along second optical path 304 as depicted. The reflected portion is directed to form an image at second image sensor 264, used to form white light video to accompany the imaging spectography as described herein.

Sliding lens group 211 of scanning system 210 is positioned downstream of beamsplitter 114 to receive the image light and direct it in a varying offset position toward a first image plane at the position of optical stop 223. A slit 224 is formed in optical stop 223 at the first image plane to allow a slit-shaped portion of the incident light pass through and be directed to a spectrometer such as that of FIG. 2. Slit 224 is oriented horizontally at the image plane, such that it extends in the direction into the drawing. Sliding lens group 211 is arranged in the optical channel upstream of the first image plane and adapted to be moved by scanning mechanism 212 linearly in a direction perpendicular to an optical axis of the imaging channel.

Figure 6:
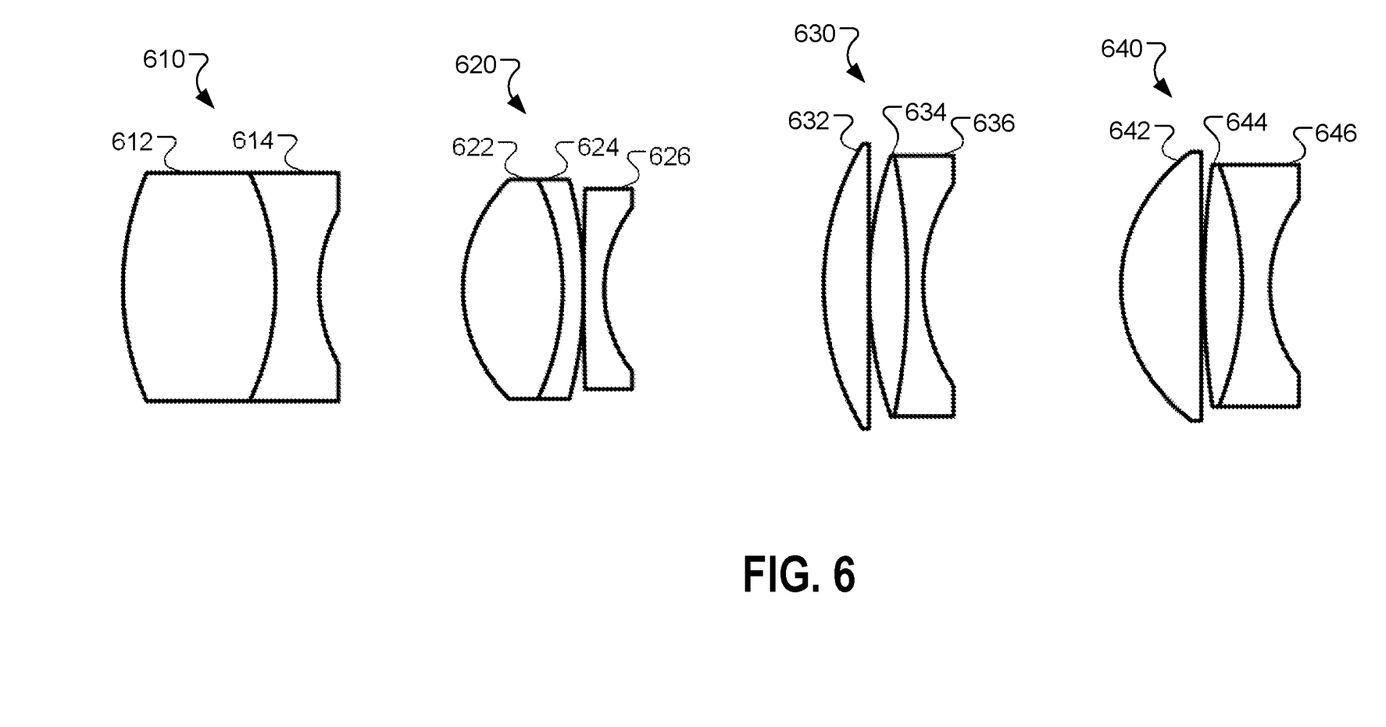
FIG. 6 shows four different implementations that may be used for a sliding lens group according to four example embodiments.

FIG. 6 shows four different implementations, labelled 610, 620, 630, and 640, that may be used for a sliding lens group according to four example embodiments. Each of the depicted designs is afocal and achieves the lateral shifting effect illustrated in FIG. 3.

Sliding lens group 610 includes a biconvex lens 612 cemented to an asymmetric biconcave lens 614. The smaller radius of curvature of the asymmetric biconcave lens is oriented downstream.

Sliding lens group 620 includes a doublet lens including a biconvex lens 622 cemented to a meniscus lens 624, followed by a convex-concave lens 626 positioned at the downstream side.

Sliding lens group 630 includes a convex-plano lens 632 and a doublet lens positioned downstream of convex-plano lens 632. The doublet lens includes a biconvex lens 634 and an asymmetric biconcave lens 636, cemented together with an overall meniscus shape.

Sliding lens group 640, the design shown in FIG. 2 and FIG. 5, includes a convex-plano lens 642 and a doublet lens positioned downstream of convex-plano lens 642. The doublet lens includes a biconvex lens 644 and an asymmetric biconcave lens 646, cemented together as a doublet with an overall meniscus shape.

Figure 7:
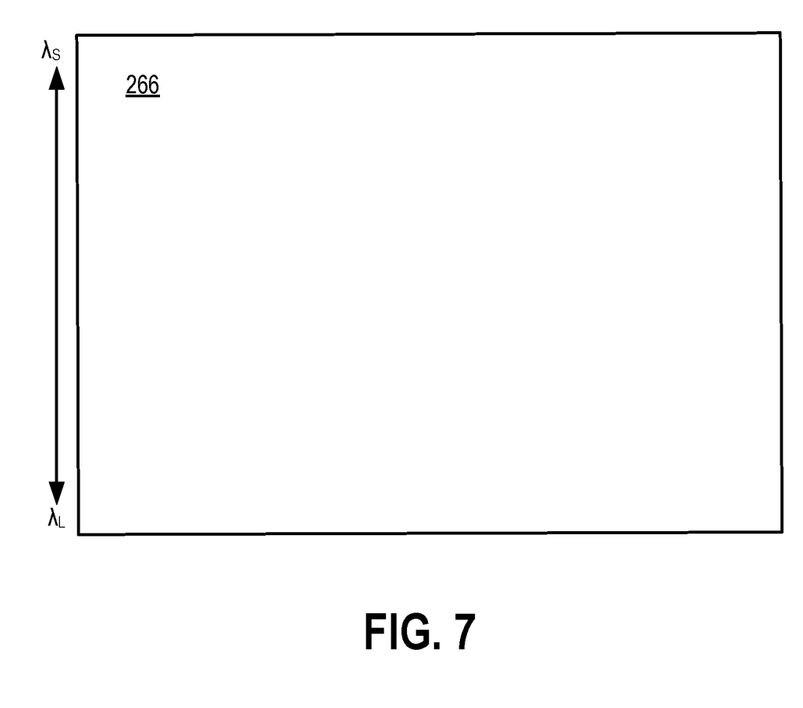
FIG. 7 shows a diagram illustrating the position of diffractions along an image sensor according to some embodiments.

FIG. 7 shows a diagram illustrating the position of diffractions along an image sensor according to some embodiments. In this embodiment, sensor 266 is a single focal plane array sensor which detects one or more selected orders of diffractions from a short wavelength $\lambda_S$ to a long wavelength $\lambda_L$ of the spectrum of interest along the vertical spatial axis. The diffractions detected may be first and/or second order in various embodiments. In some embodiments, both first and second order diffractions are detected on sensor 266 in separate regions, with second order diffractions detected from between $\lambda_S$ and a selected cutoff wavelength $\lambda_C$, and first order diffractions detected from $\lambda_C$ to $\lambda_L$. An example of such a feature is found in co-pending U.S. patent application Ser. No. 18/401,346, titled Imaging Spectrometer and Camera with High Spectral Range. The horizontal dimension of image sensor 266 captures a horizontal line or band of the incoming light in a single frame. The band is updated to scan "line by line" with reference to the field of image light incoming light, as described above with respect to scanning system 210. The scanning system operates on the incident light such that a second spatial dimension of the image spectroscopy image is captured time sequentially as a series of frames.

Figure 8:
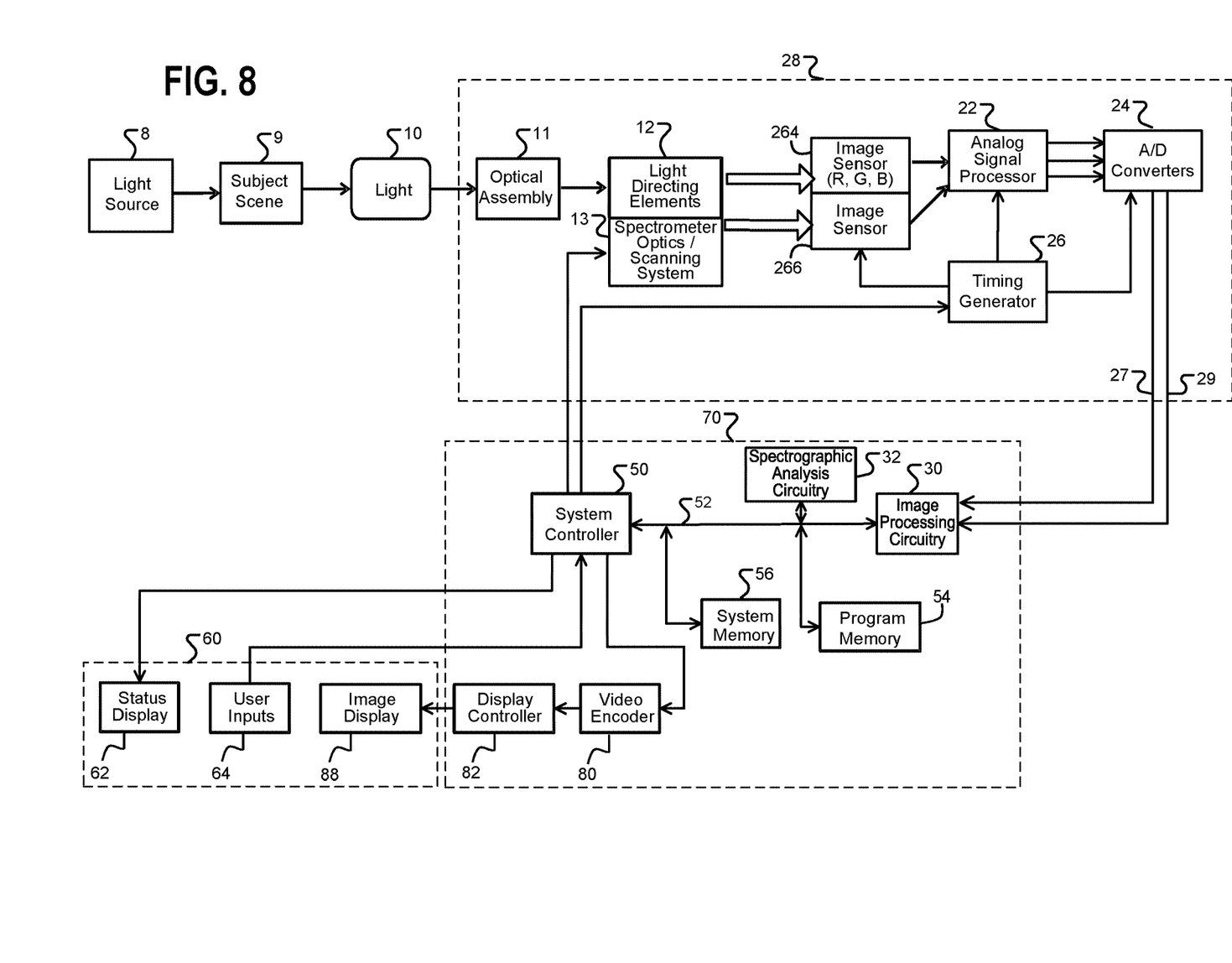
FIG. 8 is a hardware block diagram of system including an example image capture device according to an example embodiment of the invention.

FIG. 8 is a block diagram of an optical instrument system according to an example embodiment of the present invention. The depicted design is suitable for implementing the various embodiments described above, as well as other embodiments. While this example circuit is shown for an endoscope, the present invention is applicable to other instruments such as borescopes, or exoscopes, for example, as well as other scopes and imaging systems in which imaging spectrometry is useful, especially in a compact form.

A light source 8 illuminates subject scene 9 and light 10 reflected from (or, alternatively, as in the case of certain fluorescence imaging applications, transmitted or emitted by) the subject scene forms an optical image via an optical channel assembly 11, where the light is passed to the camera head, typically using a relay system comprising rod lenses. At the camera head the light is focused, aligned with the scope axis or a desired optical axis, and passed to a proximal side of optical channel assembly 11 where light directing elements 12, such as beamsplitter 114 described above, direct different portions of the light to form an image on first solid-state image sensors 264 and direct light through spectrometer optics and scanning system 13 to second solid-state image sensor 266. While two image sensors are shown in this implementation, single-sensor designs may be implemented by removing the first image sensor 264. In single sensor implementation, no white light image is captured.

In this embodiment, optical channel assembly 11 includes an imaging system constructed with a scanning system as described herein, including a sliding lens group. Image sensors 264 and 266 convert the incident light to an electrical signal by, for example, integrating charge for each picture element (pixel). The image sensors 264 and 266 may be active-pixel type complementary metal oxide semiconductor sensors (CMOS APS) or a charge-coupled devices (CCD), to give just two possible examples. The output analog signal from the image sensors is processed by analog signal processor 22 and applied to analog-to-digital (A/D) converter 24 for digitizing the analog sensor signals. In some versions (typically CMOS designs), the analog signal processing and A/D converters may be integrated into individual sensor models attached to each sensor 264 and 266. Sensor 266 may be a color or grayscale sensor, while sensor 264 is preferably a color sensor.

The system's camera 28 generally includes timing generator 26, which produces various clocking signals to select rows and pixels and synchronizes the operation of image sensors 264 and 266, analog signal processor 22, and A/D converter 24. The scanning mechanism of the scanning system may be controlled by system controller 50 or by a local timing mechanism in camera 28. A camera head electronic assembly typically houses image sensors 264 and 266, while the locations of each of analog signal processor 22, the A/D converter 24, and the timing generator 26 may vary, for example in the scope handle 102. The non-optical, functional elements of the camera 28 may be fabricated as a single integrated circuit as is commonly done with CMOS image sensors or they may be separately-fabricated integrated circuits.

The system controller 50 controls the overall operation of the image capture device based on a software program stored in program memory 54. This memory can also be used to store user setting selections and other data to be preserved when the camera 28 is turned off. Data connections 27 and 29 carry the digital image data of image sensors 264 and 266 to image processing circuitry 30, which may be integrated with system controller 50 in some versions or may be a separate programmable logic device or data processor. A data bus 52 provides a pathway for address, data, and control signals and spectrographic analysis data from spectrographic analysis circuitry 32. Control signals are sent to spectrometer optics/scanning system 13 and timing generator 26. In some variations, data bus 52 may also carry data connections 27 and 29.

Image processing circuitry 30 performs image processing operations including the operations to form images from image sensor 264 and partial spectrograph images from image sensor 266, that is the individual frames which are combined for spectrographic analysis. Spectrographic analysis circuitry 32 receives the partial spectrograph images and performs spectrographic analysis including normalizing the data based on the spectral transfer function of the spectrometer optics, calculating spectral content, and creating a combined image spectral data set including spectral data for each image pixel acquired based across a complete line-by-line scan by the scanning system. Spectrographic analysis circuitry 32 may also perform spectral analysis to identify, classify, or highlight features found in the image spectral data set, and prepare representative images for display to visualize or otherwise present the spectrographic data in the spectral data set. As such, spectrographic analysis circuitry 32 may perform any suitable processing and visualization techniques employed with multispectral imaging (MSI) and hyperspectral imaging (HSI) analysis.

Processed image data are continuously sent to video encoder 80 to produce a video signal. This signal is processed by display controller 82 and presented on image display 88. This display is typically an HD, UHD, or 4K format liquid crystal display backlit with light-emitting diodes (LED LCD), although other types of displays may be used as well. The processed image data can also be stored in system memory 56 or other internal or external memory device.

The user interface 60, including all or any combination of image display 88, user inputs 64, and status display 62, is controlled by a combination of software programs executed on system controller 50. User inputs typically include some combination of typing keyboards, computer pointing devices, buttons, rocker switches, joysticks, rotary dials, or touch screens. The system controller 50 may manage the graphical user interface (GUI) presented on one or more of the displays (e.g., on image display 88). The GUI typically includes menus for making various option selections.

Image processing circuitry 30, spectrographic analysis circuitry 32, system controller 50, system and program memories 56 and 54, video encoder 80, and display controller 82 may be housed within camera control unit (CCU) 70. CCU 70 may be responsible for powering and controlling light source 8 and/or camera 28. As used herein "CCU" refers to units or modules that power, receive data from, manipulate data from, transmit data to, and/or forwards data from optical instrument cameras. CCU functionalities may be spread over multiple units known as, for example, a "connect module", "link module", or "head module".

As used herein the terms "comprising," "including," "carrying," "having" "containing," "involving," and the like are to be understood to be open-ended, that is, to mean including but not limited to. Any use of ordinal terms such as "first," "second," "third," etc., in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having a same name (but for use of the ordinal term).

The foregoing has outlined rather broadly the features and technical advantages of the invention in order that the detailed description of the invention that follows may be better understood. It should be appreciated by those skilled in the art that the conception and specific embodiments disclosed may be readily utilized as a basis for modifying or designing other structures for carrying out the same purposes of the invention. It should also be realized by those skilled in the art that such equivalent constructions do not depart from the scope of the invention as set forth in the appended claims.

Although the invention and its advantages have been described in detail, it should be understood that various changes, substitutions and alterations can be made herein without departing from the scope of the invention as defined by the appended claims. The combinations of features described herein should not be interpreted to be limiting, and the features herein may be used in any working combination or sub-combination according to the invention. This description should therefore be interpreted as providing written support, under U.S. patent law and any relevant foreign patent laws, for any working combination or some sub-combination of the features herein.

Moreover, the scope of the present application is not intended to be limited to the particular embodiments of the process, machine, manufacture, composition of matter, means, methods and steps described in the specification. As one of ordinary skill in the art will readily appreciate from the disclosure of the invention, processes, machines, manufacture, compositions of matter, means, methods, or steps, presently existing or later to be developed that perform substantially the same function or achieve substantially the same result as the corresponding embodiments described herein may be utilized according to the invention. Accordingly, the appended claims are intended to include within their scope such processes, machines, manufacture, compositions of matter, means, methods, or steps.

The invention claimed is:

1. A hyperspectral imaging device comprising:
   an optical channel arranged to focus incident light at a first image plane to form an image at the first image plane;
   a spectrometer comprising:
      a slit formed in an optical stop at the first image plane to allow a slit-shaped portion of the incident light pass through;
      a dispersive element constructed and arranged to receive incident light from the slit and spectrally disperse it along a direction perpendicular to a width of the slit;
      a focusing lens arranged to focus the spectrally dispersed light at a second image plane such that the spectral dispersion is imaged along a first axis of the second image plane, and a spatial image of the slit width is imaged along a second axis of the image plane; and
      a focal plane array sensor at the second image plane operable to detect the spectrally dispersed light; and
   a sliding lens group arranged between the optical channel and the first image plane and adapted to move linearly in a direction perpendicular to an optical axis of the imaging channel and perpendicular to a length of the slit, to direct the incident light in a varying offset position thereby scanning the entire image over the slit such that multiple frames acquired time sequentially by the focal plane array sensor each correspond to a horizontal line of the image.

2. The device according to claim 1 further comprising an image processor communicatively coupled to the focal plane array sensor and operable to process the multiple frames into a hyperspectral or multispectral data cube comprising data sufficient for a 2D image of the scene at a multiplicity of spectral bands.

3. The device according to claim 2 wherein the image processor is further operable to create an image based on the hyperspectral or multispectral data cube for display to the user which conveys information not easily discernible by white light imaging.

4. The device according to claim 1 wherein the imaging objective is telecentric.

5. The device according to claim 1 wherein the sliding lens group is afocal.

6. The device according to claim 1 wherein a distal lens surface of the sliding lens group is convex and a proximal lens surface is concave.

7. The device according to claim 6 wherein the sliding lens group comprises a cemented doublet with an overall meniscus shape.

8. The device according to claim 1 further comprising a collimating lens group optically arranged between the slit and the dispersive element.

9. The device according to claim 1 wherein the dispersive element comprises a diffraction grating.

10. The device according to claim 9, wherein the diffraction grating is a blazed diffraction grating.

11. The device according to claim 1 wherein the dispersive element comprises a prism.

12. The device according to claim 1 further comprising a beamsplitter upstream from the slit adapted to redirect a portion of incident light from the scene such that it is imaged onto a third image plane without passing through the slit.

13. The device according to claim 12 further comprising a sensor in the third image plane which collects the redirected portion of light and creates a white light image at a frame rate suitable for live video.

14. The device according to claim 12 wherein the sliding lens group is between the beamsplitter and the slit.

15. An imaging spectrometer camera adapted to receive incident light from a medical scope, comprising:
   an optical channel receiving and focusing incident light at a first image plane to form an image at the first image plane;
   an imaging spectrometer positioned downstream from the optical channel and comprising:
      a slit formed in an optical stop at the first image plane to allow a slit-shaped portion of the incident light pass through;
      a dispersive element constructed and arranged to receive incident light from the slit and spectrally disperse it along a direction perpendicular to a width of the slit;
      a focusing lens arranged to focus the spectrally dispersed light at a second image plane such that the spectral dispersion is imaged along a first axis of the second image plane, and a spatial image of the slit width is imaged along a second axis of the image plane; and
      a focal plane array sensor at the second image plane operable to detect the spectrally dispersed light; and
   a scanning system comprising a sliding lens group arranged in the optical channel upstream of the first image plane and adapted to move linearly in a direction perpendicular to an optical axis of the imaging channel and perpendicularly to length of the slit, to direct the incident light in a varying offset position thereby scanning the entire image over the slit such that multiple frames acquired time sequentially by the focal plane array sensor each correspond to a horizontal line of the image.

16. The imaging spectrometer camera according to claim 15 wherein the imaging objective is telecentric.

17. The imaging spectrometer camera according to claim 15 wherein the sliding lens group is afocal.

18. The imaging spectrometer camera according to claim 15 wherein a distal lens surface of the sliding lens group is convex and a proximal lens surface is concave.

19. The imaging spectrometer camera according to claim 15 wherein the sliding lens group comprises a cemented doublet with an overall meniscus shape.

* * * * *